United States Patent Office 3,234,450
Patented Feb. 8, 1966

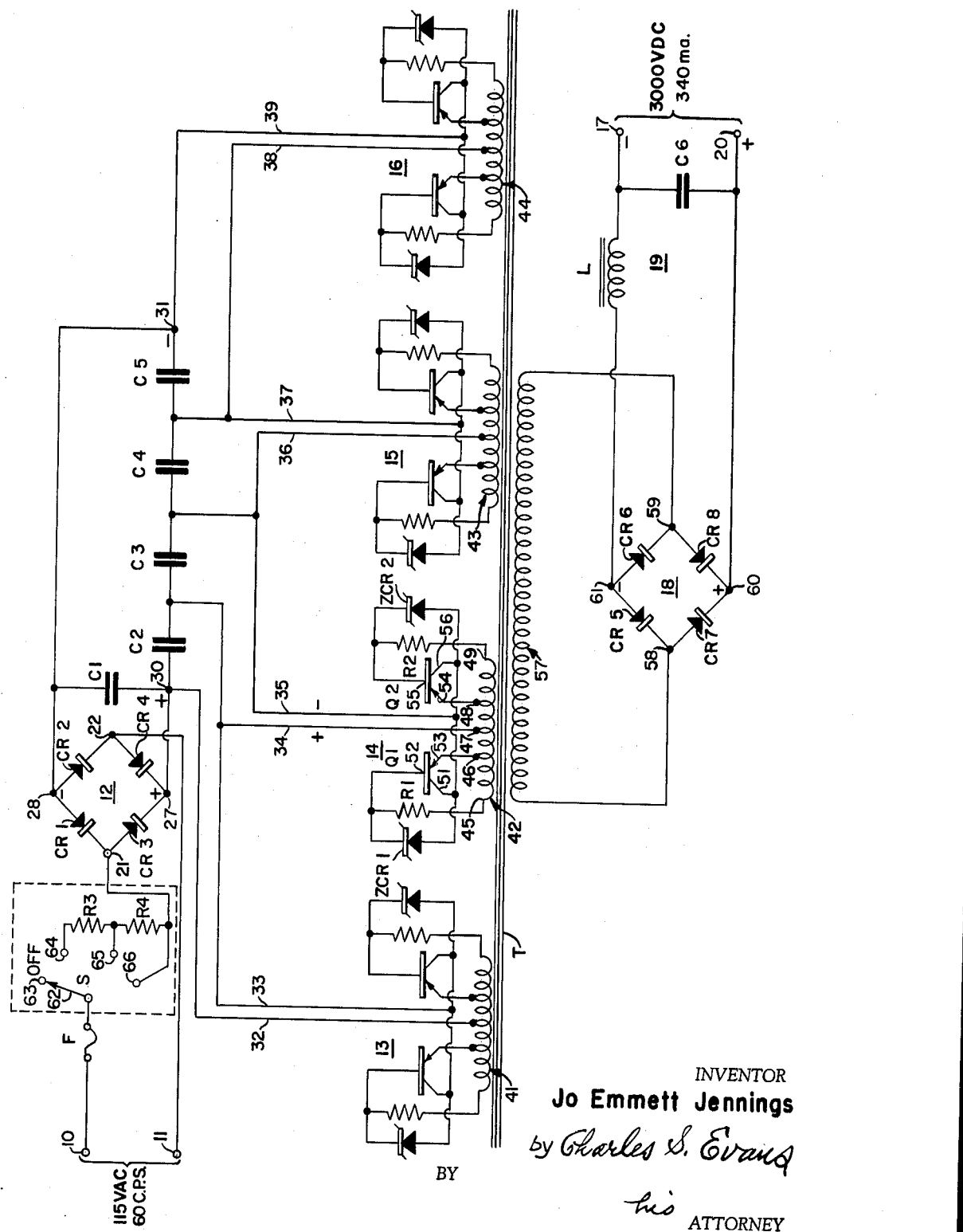

3,234,450
LIGHTWEIGHT D.C. POWER SUPPLY
Jo Emmett Jennings, San Jose, Calif., assignor, by mesne assignments, to Jennings Radio Manufacturing Corporation, San Jose, Calif., a corporation of Delaware
Filed Feb. 6, 1961, Ser. No. 87,236
8 Claims. (Cl. 321—2)

This invention relates to a D.C. power supply, more specifically to a high voltage, high power, transistorized power supply whose input A.C. is converted to a low voltage, high power D.C. which is then used to drive a high frequency oscillator, with the voltage transformation and filtering taking place at relatively high frequencies.

The phrase "high voltage," when used in this specification, refers to voltages on the order of 1000 volts or more. "High power" means 500 watts or more.

In any D.C. power suply designed to operate from a relatively low frequency source, such as the standard 6.0 c.p.s. supply, the size and weight of the power transformer and filter inductance are limiting factors. In low power, low voltage supplies, these are usually manageable; but in high power, high voltage supplies their size and weight become formidable problems.

The core material, and the copper used in the windings, are largely responsible for the size and weight of the power transformer and the filter inductance. It is well known in the art that the size and weight of a transformer decrease as the operating frequency is increased, the cross-sectional area of the core is inversely proportional to the frequency, as is the number of windings in both the primary and secondary. Likewise, the size and weight of the filter inductance required decrease as the frequency of the ripple to be filtered increases. In a power supply operated from a 60 c.p.s. source, the power transformer normally operates at 60 c.p.s.; and the ripple frequency at the filter inductance is either 60 or 120 pulsations per second, depending upon whether the rectification is half wave or full wave, respectively.

It is accordingly an object of this invention to achieve a high power, high voltage, D.C. power supply which is light in weight and compact in size by designing it so that the power transformer is operated at a frequency much higher than the supply frequency, and the ripple frequency presented to the filter inductance will be twice the oscillator frequency.

It is an additional object of this invention to provide a power supply having life and reliability considerable greater than the normal vacuum tube supply by using semiconductor devices for all active components, due to the low internal resistance of the semi-conductors.

The stated objects are achieved in the invention by transformerless rectification of the source A.C. to obtain a relatively low voltage D.C., using this D.C. to drive an oscillator having a frequency much higher than the source frequency, stepping up the voltage of the oscillator output with a transformer, then rectifying and filtering the transformer output to obtain the required high voltage D.C. Obviously, although this invention finds its most important application where it has its greatest advantage, in high power D.C. power supplies, the inventive principle is equally valid for any A.C. voltage conversion.

Although semiconductor devices are used as active elements throughout in order to achieve the stated objectives of increased reliability and decreased size and weight, the invention may also be practiced using vacuum tube circuitry, but with reduced efficiencies and increased size and weight.

The schematic diagram of the figure illustrates one embodiment of the invention: a three kv. (kilovolt), one kw. (kilowatt), D.C. power supply designed to operate from a 60 c.p.s., 115 volt supply.

SUMMARY OF OPERATION

The 115 volt, 60 c.p.s. supply voltage is applied between input terminals 10 and 11, rectified to D.C. by semiconductor rectifier bridge 12, and used to drive four series-connected transistorized 800 cycle oscillators, 13, 14, 15, and 16. The 800 cycle output of the oscillator string is stepped up in voltage by transformer T, rectified by semiconductor bridge 18, and smoothed by filter 19 to obtain the required D.C. output of 3 kv. at 340 ma. at terminals 17 and 20.

DETAILED CIRCUIT DESCRIPTION

The 115 volt, 60 c.p.s. current of the supply is applied to input terminals 10 and 11, fed through fuse F and switch S and associated circuitry (whose function will be described below) to vertices 21 and 22 of bridge rectifier 12. Bridge rectifier 12 is a standard configuration of four semiconductor rectifiers $CR^1$, $CR^2$, $CR^3$ and $CR^4$ and its operation need not be described in detail. The bridge configuration is used here in preference to a standard two element full wave rectifier because it provides almost twice the output voltage and it requires elements having only half the peak inverse voltage. This bridge configuration is particularly adapted for use with semiconductor devices since the high voltage filaments which are needed in a tube bridge are not required. Semiconductor rectifier elements having a current rating of from 20 to 40 amperes are satisfactory for use in bridge 12. The rectified current is taken from vertices 27 and 28 of bridge 12, with the voltage at vertex 27 being positive with respect to that at vertex 28, and filtered by capacitor C1, which has a capacitance of 2200 microfarads at a working voltage of 150 volts.

The resulting D.C. voltage of about 112 volts, which appears between junction 30 and 31 (positive and negative respectively), is applied across the string of series connected, transistorized, push-pull oscillators 13, 14, 15 and 16. The particular oscillator configuration used here is dictated in part by the limitations of the active elements used therein. Since, at the present time, high power, high voltage transistors are extremely expensive and difficult to obtain, multiple oscillators are used to reduce the power and voltage ratings required of each transistor. The use of four push-pull oscillators series-connected means that each transistor will operate at only one quarter of the D.C. voltage available across capacitor C1, and that each transistor must supply only one eighth of the total power required of the oscillator.

The series connection of the oscillators may be seen by following the current path from positive terminal 30 to negative terminal 31. The current follows, from terminal 30, the positive supply lead 32 of oscillator 13, through oscillator 13, then through the negative supply lead 33 of oscillator 13 to the positive supply lead 34 of oscillator 14, through oscillator 14 and then through lead 35, and so on through the potential supply pairs 36–37 and 38–39 of oscillators 15 and 16 respectively, and finally to negative terminal 31. One fourth of the available D.C. voltage, or about 28 volts, will be dropped across each of the four identical oscillators in the series string.

Capacitors C2, C3, C4, and C5, which are connected across the D.C. supply leads to oscillators 13, 14, 15 and 16 respectively, each have a capacity of 5,000 microfarads and provide additional filtering both of the low frequency (120 c.p.s.) ripple in the D.C. voltage supplied to the oscillators and of unwanted transients generated by the oscillators themselves.

The output of each oscillator comprises a primary winding of saturable core toroidal transformer T. The four primary windings 41, 42, 43 and 44, corresponding to oscillators 13, 14, 15 and 16 respectively, are so wound upon the core of transformer T that their inductive effect is cumulative for synchronized oscillation of the four oscillators. The oscillators, being identical, will all oscillate at the same frequency. They are phase and frequency locked, or synchronized, as a result of the proximity of their output windings on the core of transformer T: the lines of magnetic flux generated by a surge of current of a certain polarity through one winding will link the other three windings, tending to reinforce a current surge therein of the same polarity and oppose any of opposite polarity; the result is that the current surges through all four windings are coerced into operating in unison, effectively synchronizing the oscillators. Any unfiltered ripple remaining upon the D.C. potential between junctions 30 and 31 will be impressed simultaneously across each oscillator, and the simultaneous fluctuations in the D.C. supply to each oscillator will also tend to synchronize their oscillations.

Since all four oscillators are identical the operation of only one, 14, will be described. This is a push-pull multivibrator type oscillator utilizing two PNP transistors, Q1 and Q2, as active elements. Delco type 2N174 transistors have proven satisfactory. Oscillator 14 is part of the voltage divider connected across junctions 30 and 31 as explained above, and the approximately 28 v. D.C. for its operation is supplied by wires 34 and 35, with wire 34 being positive with respect to wire 35. Considering the system as initially at rest; when the operating potential of 28 v. D.C. is applied between wires 34 and 35, both transistors Q1 and Q2 will start to conduct. The current path for Q2 conduction is from the positive potential on wire 34, through winding 47–48, to emitter 54, through transistor Q2 to collector 56, and thence to the negative potential on wire 35. The current path for Q1 conduction is symmetrical, encompassing wire 34, winding 46–47, emitter 53, transistor Q1, collector 51, and wire 35.

Although the circuitry for each transistor is identical, small differences in component characteristics will cause one transistor to conduct slightly more heavily than the other. Assume Q2 is conducting more heavily than Q1. Since the oscillator is just starting, the core of transformer T will not be saturated. The increasing core flux caused by the increasing Q2 current flow through winding 47–48 will induce voltages in windings 45–46, 46–47 and 48–49, such that the higher numbered terminal in each pair is negative with respect to the other. This induced voltage in winding 45–46 will drive base 52 positive with respect to emitter 53, cutting off transistor Q1. The voltage induced in winding 48–49 will drive base 55 more negative with respect to emitter 54, increasing Q2 conduction. This regenerative action will continue until the core flux of transformer T reaches positive saturation, and is not affected by further increases in current in winding 47–48. With the core flux constant, the voltages induced in windings 45–46, 46–47 and 48–49 will quickly fall to zero. This removes the negative driving potential from base 55 of transistor Q2, tending to drive it toward cutoff. The flux density in the saturable core of transformer T will fall slightly, inducing in all transformer windings voltages of opposite polarity to those induced by Q2 conduction. This will cause the base 55 of transistor Q2 to become more positive with respect to emitter 54, driving Q2 further into cutoff. Base 52 of transistor Q1 will be driven slightly negative with respect to emitter 53, causing transistor Q1 to conduct slightly. This slight conduction of Q1 will build up rapidly due to the regenerative action of the oscillator, as described above for Q2 conduction, and the flux in the core of transformer T will be driven toward negative saturation. As the core of transformer T reaches negative saturation, transistor Q1 will be cut off, and transistor Q2 will again start to conduct, repeating the cycle. Resistors R1 and R2 are 300 ohm resistors placed in series with base 52 and base 55 respectively to limit current flow and protect the transistor.

In any high power oscillator, such as used here, the elimination of high voltage transient peaks is important in order to protect the transistors and keep them from breaking down. Zener diodes ZCR1 and ZCR2, having reverse (Zener) voltage ratings of 63–65 volts, are connected between the base and collector of Q1 and Q2 respectively to act as transient suppressors. They operate to prevent the base of either transistor from going more than 63–65 volts positive with respect to the collector.

The output of each oscillator, developed across its corresponding winding, is a square wave whose peak-to-peak amplitude is roughly twice the individual oscillator D.C. supply voltage of 28 volts. The frequency of oscillation is determined by the saturation flux of the core of transformer T and by its windings; the voltage developed across secondary winding 57 is determined by the turns ratio of the primary and secondary windings. In this application the toroidal core is chosen and wound to provide an oscillator frequency of 800 c.p.s. and a voltage of about 3200 volts across secondary winding 57.

The high voltage from secondary winding 57 of transformer T is then applied to vertices 58 and 59 of bridge rectifier 18. This bridge is a standard configuration using four silicon semiconductor rectifiers CR5, CR6, CR7 and CR8, each having a peak inverse voltage of 4800 volts and a current capacity of one half an ampere.

The pulsating D.C. on vertices 60 and 61 of bridge 18 (with vertex 60 being positive with respect to vertex 61), is then smoothed by filter 19, consisting of choke L, having an inductance of 0.1 henry, and capacitor C6, having a capacity of from 2 to 4 microfarads and a working voltage of 3 kv. The frequency of the ripple on the pulsating D.C. fed to inductance L will be 1600 c.p.s. rather than 120 c.p.s. as in a standard full wave rectifier. Also, the square wave configuration of the output from the oscillators aids filtering, and much smaller filter components are required than would be the case for a sinusoidal oscillator output.

An essentially smooth D.C. voltage of approximately 3 kv. (3200 volts at transformer secondary 57 less about 200 volts drop in the rectifier and filter) is delivered to output terminals 17 and 20, with terminal 20 being positive with respect to terminal 17. This power supply will deliver about 340 milliamperes of current at its 3 kv. output voltage, giving it a power output rating of one kv.

Fuse F is standard overload protection.

Switch S, and resistors R3 and R4 associated with it, serve to prevent a large surge of starting current from burning out any of the components when the power supply is first turned on. The capacitive reactance presented by capacitor C1 in parallel with series-connected capacitors C2, C3, C4, and C5 to the 120 c.p.s. ripple frequency across vertices 27 and 28 of bridge 12, computed according to the formula Capacitive reactance =

$$\frac{1}{2\text{ pi} \times \text{frequency (c.p.s.)} \times \text{capacitance (farads)}}$$

would be theoretically about 0.4 ohm. Measurements show this reactance to be actually closer to 0.8 ohm. This would allow about 140–150 amperes to flow instantaneously as the equipment is turned on with no initial charge on the capacitors. This is prevented by the circuitry connected with switch S, which is arranged so that resistors R3 and R4, each of about 5 ohms resistance, are in the line in series connection when the equipment is first turned on and switch arm 62 is moved from OFF terminal 63 to terminal 64. This will limit the starting current surge to about 10 amperes. As the capacitors charge, limiting the current, switch arm 62 may be moved further clockwise to terminal 65, shorting out R3 and leaving R4 in the circuit; and when the capacitors are fully charged and normal current flows, switch arm 62 may be moved all the way clockwise to terminal 66, which is the normal operating position, with both resistors out of the circuit.

The power supply of this embodiment, using a small blower fan to cool the active elements rather than metallic heat sinks, which are heavy and occupy considerable space, may be packaged in a unit measuring 5 x 7 x 18 inches and weighing under 13 pounds. A comparison of this weight with 80 pounds, which is the weight of the lightest known one kw., 50 c.p.s. supply of standard design, points up the improvement effected by the design of this invention.

The power supply of this embodiment has a voltage regulation of about 5%, compared to the 10 to 15% regulation of standard 1 kw. supplies operating from 60 c.p.s.

I claim:

1. A power supply for converting relatively low voltage source A.C. into high voltage, high power D.C. comprising: first semiconductor rectifier means having input terminals and output terminals; surge suppression means connecting said source A.C. directly to said input terminals; filter means comprising a plurality of capacitor elements serially connected across said output terminals to produce a relatively low D.C. voltage; a plurality of semiconductor oscillator means powered by said low D.C. voltage connected to said filter means and oscillating at a frequency substantially higher than that of said source A.C., each of said oscillators being connected across a corresponding one of said capacitor elements; a transformer having primary and secondary winding means, the output of said oscillator means being developed across said primary winding means and inducing in said secondary winding means a high-voltage A.C.; and second semiconductor rectifier means having an input connected to said secondary winding means and having a high voltage, high power D.C. output.

2. The power supply of claim 1, wherein said primary means includes a plurality of separate windings on said transformer, the output of each oscillator being developed across a corresponding one of said primary windings.

3. The power supply of claim 2, wherein each of said plurality of oscillators is identical, each oscillator operating at the same frequency and being synchronized by the magnetic flux generated in said primary windings.

4. The power supply of claim 3, wherein said secondary winding means is comprised of a single secondary winding.

5. The power supply of claim 4, wherein said oscillators are connected in series across the output terminals of said first semiconductor rectifier means.

6. The power supply of claim 5, wherein each of said oscillators is a two-transistor, push-pull multivibrator type having transient suppression means.

7. The power supply of claim 6, wherein said transient suppression means comprises a Zener diode connected directly across the base and collector elements of each of said transistors.

8. The power supply of claim 7, wherein said first and second semiconductor rectifier means are bridge circuits each comprised of four semiconductor rectifier elements.

References Cited by the Examiner

UNITED STATES PATENTS

| | | | |
|---|---|---|---|
| 2,611,118 | 9/1952 | Haulick | 321—8 |
| 2,720,622 | 10/1955 | Deuser | 321—2 X |
| 2,767,359 | 10/1956 | Larsen et al. | 321—2 X |
| 2,785,370 | 3/1957 | Levy | 321—2 |
| 2,837,651 | 6/1958 | Schultz | 321—2 |
| 2,843,745 | 7/1958 | Smith | 321—2 |
| 2,900,606 | 8/1959 | Faulkner | 331—113 |
| 2,923,856 | 2/1960 | Greene et al. | 321—8 |
| 2,948,841 | 8/1960 | Locanthi et al. | 321—45 |
| 2,972,710 | 2/1961 | D'Amico | 321—2 |
| 2,983,846 | 5/1961 | Roesel et al. | 331—114 |
| 2,990,517 | 6/1961 | Grieg | 331—113 X |
| 3,070,759 | 12/1962 | Brouwer | 331—113.1 |

OTHER REFERENCES

Reliable Design of Transistor Inverters: by J. S. Schaffner, published in Missile Design and Development (June 1959), pages 52–54.

LLOYD McCOLLUM, *Primary Examiner.*

SAMUEL BERNSTEIN, *Examiner.*